United States Patent [19]
Cook et al.

[11] Patent Number: 5,720,891
[45] Date of Patent: Feb. 24, 1998

[54] RETRACTABLE SEDIMENT COLLECTING DEVICE FOR COVERED BASINS

[75] Inventors: Lynn W. Cook, Fruit Heights; Michael J. Graham, Tooele; Brad K. Hansen; Marty L. Stout, both of Salt Lake City; Jeremy G. Scott, West Bountiful, all of Utah

[73] Assignee: Baker Hughes Incorporated, Houston, Tex.

[21] Appl. No.: 631,140

[22] Filed: Apr. 15, 1996

[51] Int. Cl.[6] ................................................. B01D 21/18
[52] U.S. Cl. ........................ 210/803; 210/527; 210/531
[58] Field of Search .......................... 210/803, 523, 210/525, 527, 531

[56] References Cited

U.S. PATENT DOCUMENTS

| | | | |
|---|---|---|---|
| 1,918,742 | 7/1933 | Elrod | 210/527 |
| 3,498,465 | 3/1970 | Klump et al. | 210/527 |
| 4,401,576 | 8/1983 | Meurer | 210/525 |
| 4,486,309 | 12/1984 | Krodel | 210/531 |
| 4,927,537 | 5/1990 | Meurer | 210/527 |
| 4,986,141 | 1/1991 | Meurer | 74/89.22 |
| 4,986,915 | 1/1991 | Meurer | 210/527 |
| 5,149,057 | 9/1992 | Meurer | 210/527 |

FOREIGN PATENT DOCUMENTS

| | | |
|---|---|---|
| 293285 | 7/1965 | Netherlands . |
| 603496 | 8/1978 | Switzerland . |
| 733825 | 7/1955 | United Kingdom . |

*Primary Examiner*—Christopher Upton
*Attorney, Agent, or Firm*—Trask, Britt & Rossa

[57] ABSTRACT

A retractable sediment collection device for use in settling tanks is disclosed which has means for collecting and removing sediment from the floor of the settling tank. The retractable sediment collection device is structured to move back and forth along the floor of a tank to remove the sediment therefrom. The retractable sediment collection device includes a lifting mechanism which engages a sediment collector and raises it from the floor of the tank. Although the retractable sediment collection device is suitable for use in any kind of settling tank, it is particularly suited for use in closed tanks where access to the interior of the tank is limited through a single opening. The retractable sediment collector may be raised from floor of the tank to the top of the tank where the operating mechanisms can be accessed for repair or maintenance without removing the entire sediment collector from the tank.

20 Claims, 9 Drawing Sheets

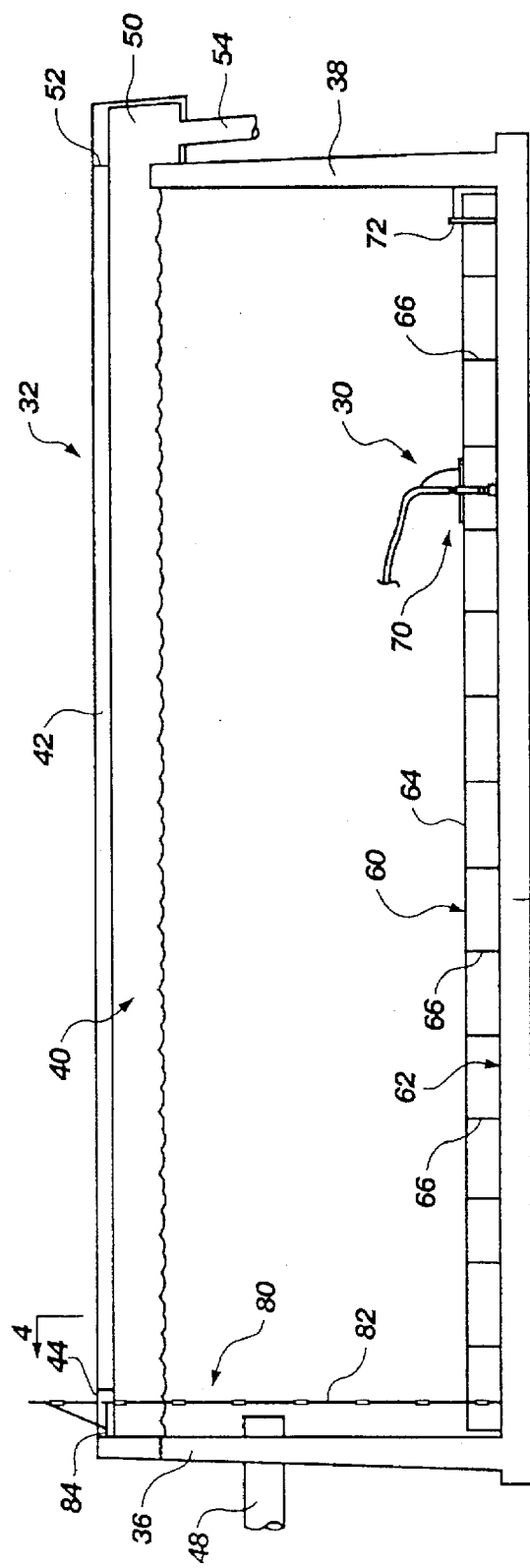
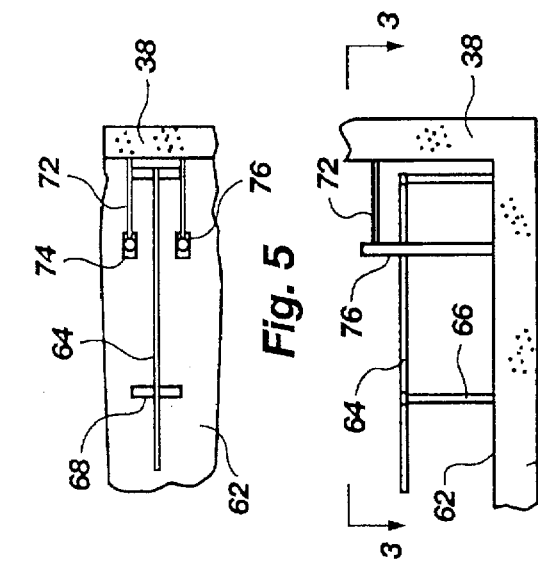
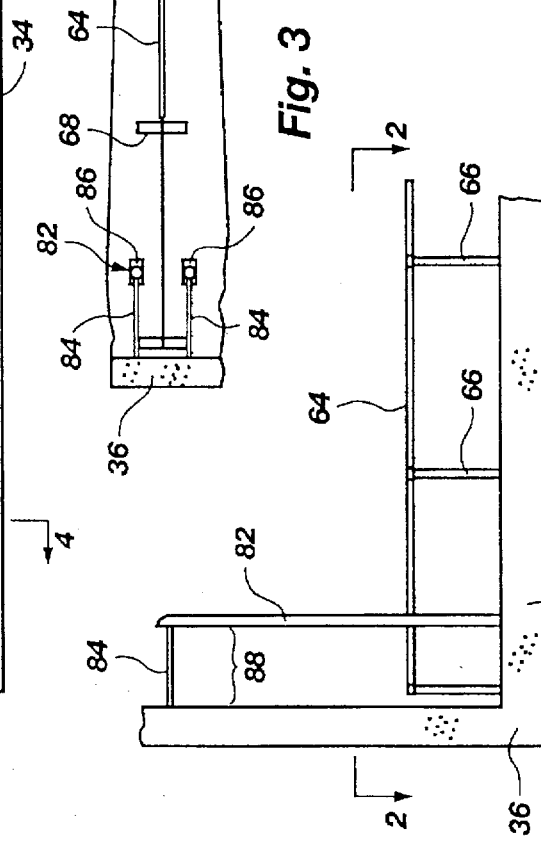

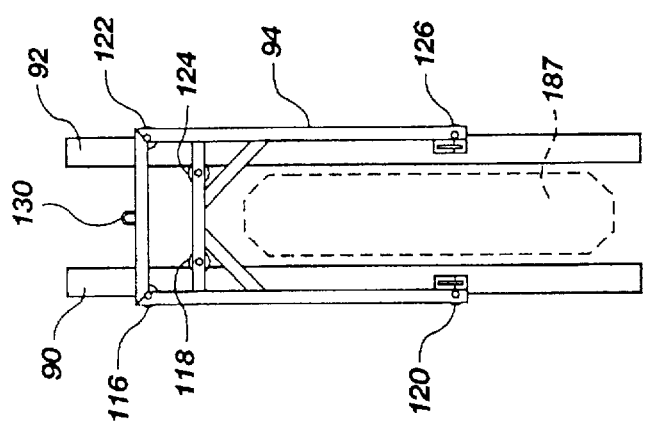
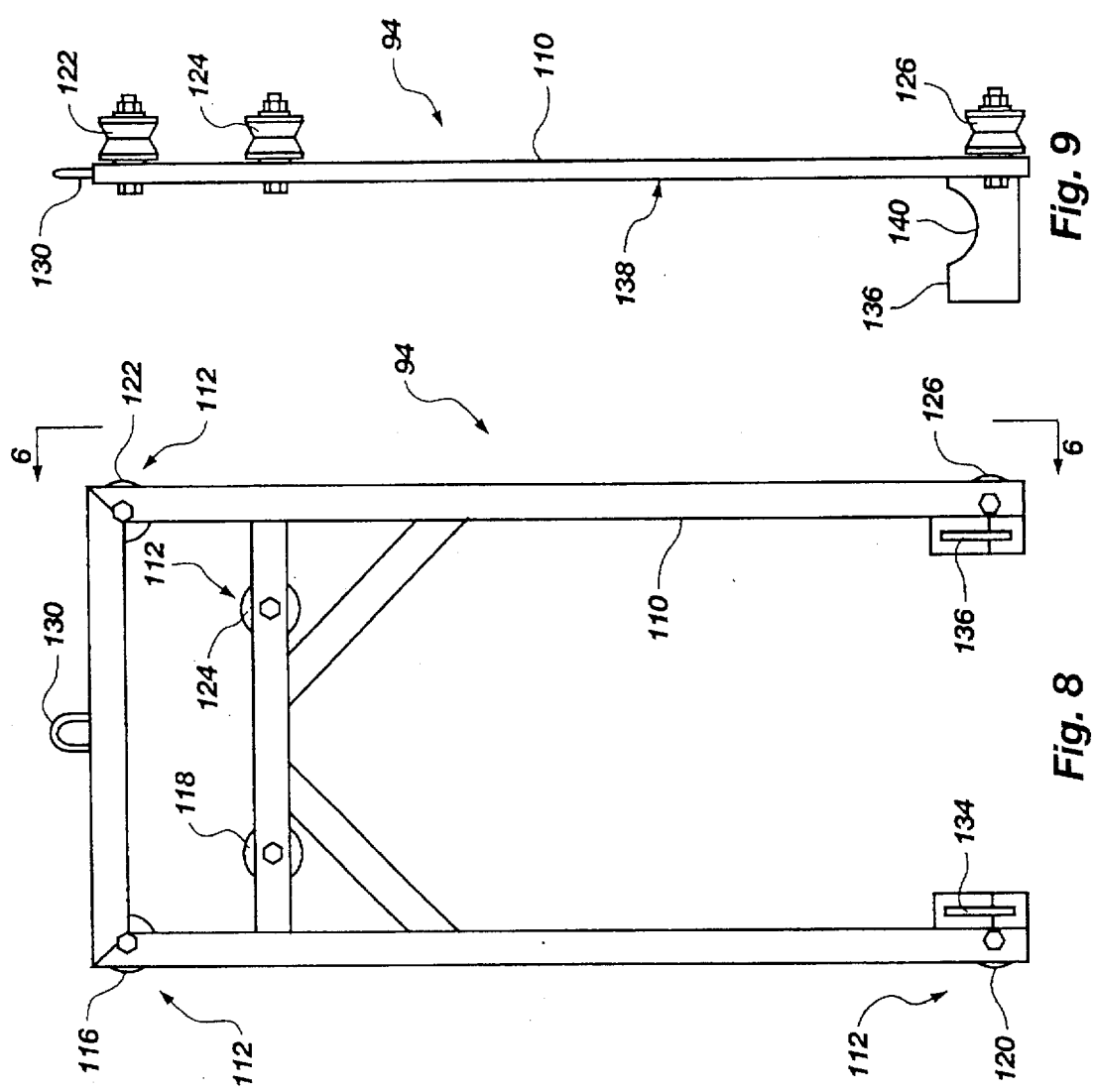

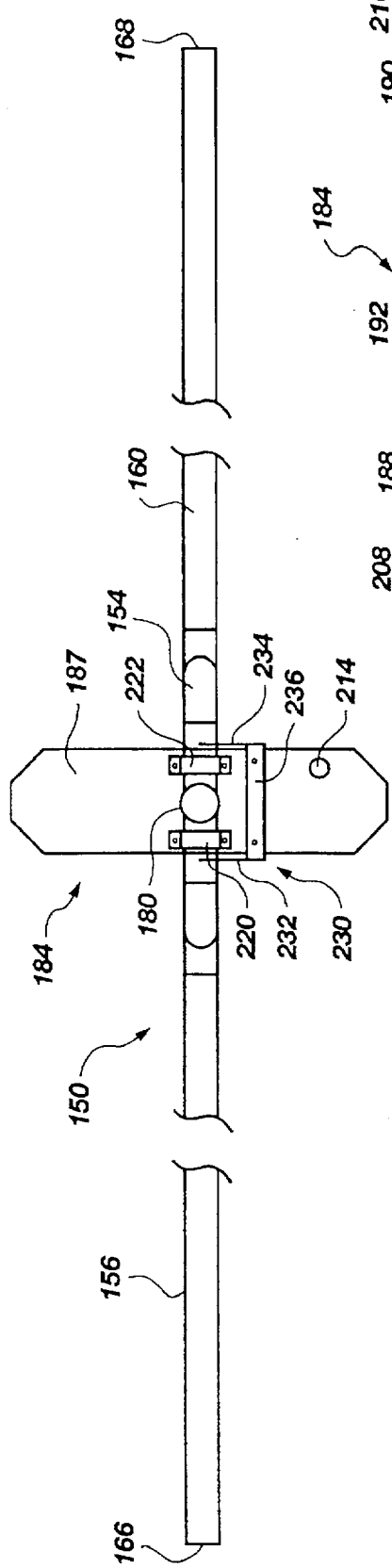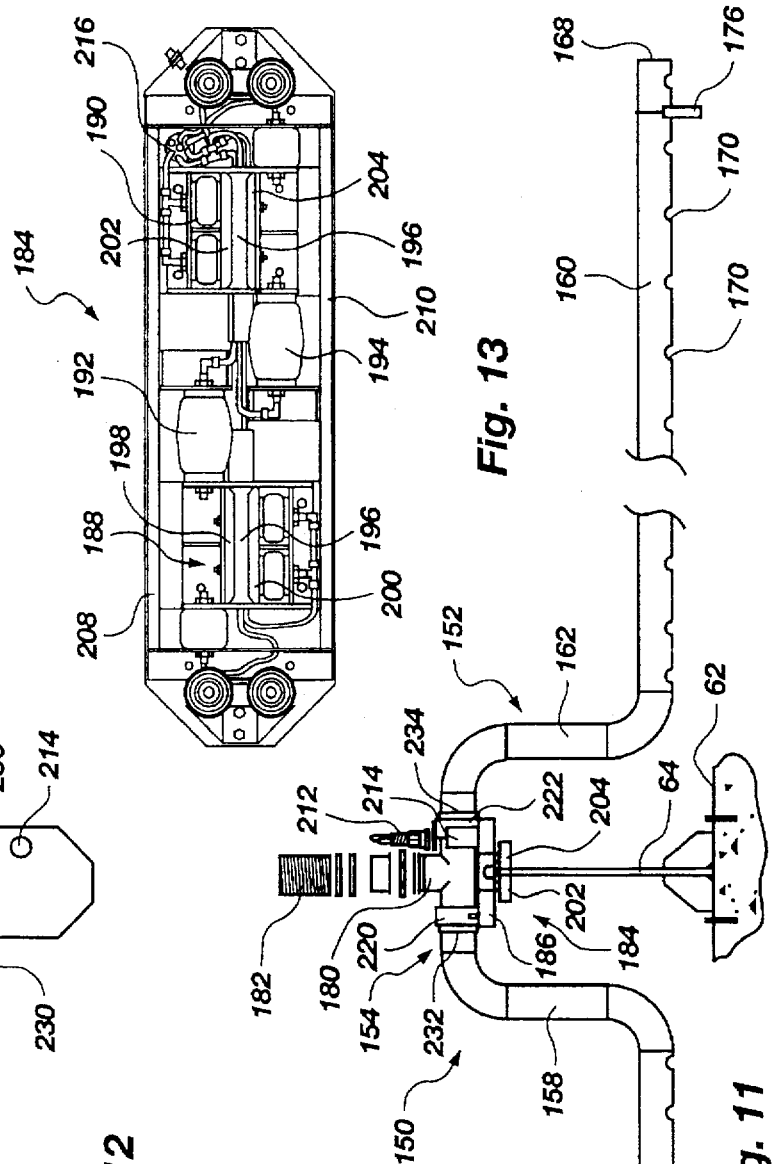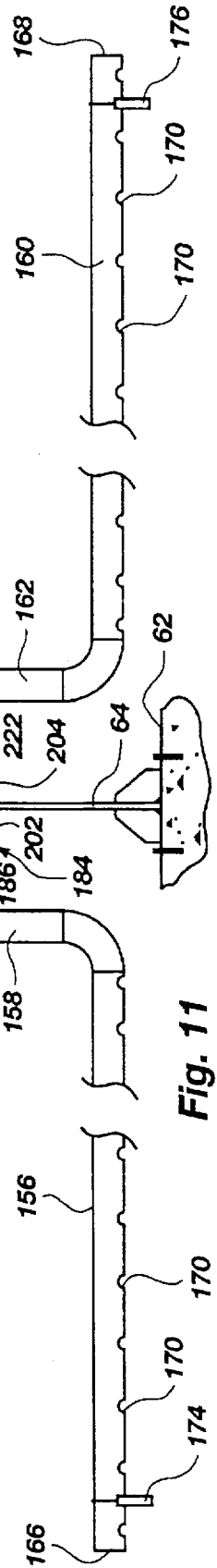

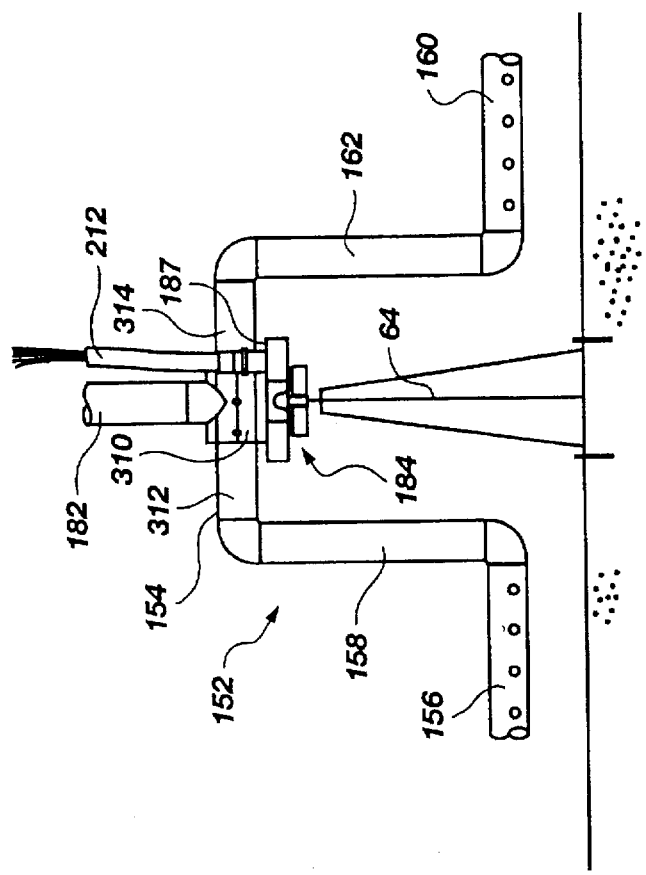
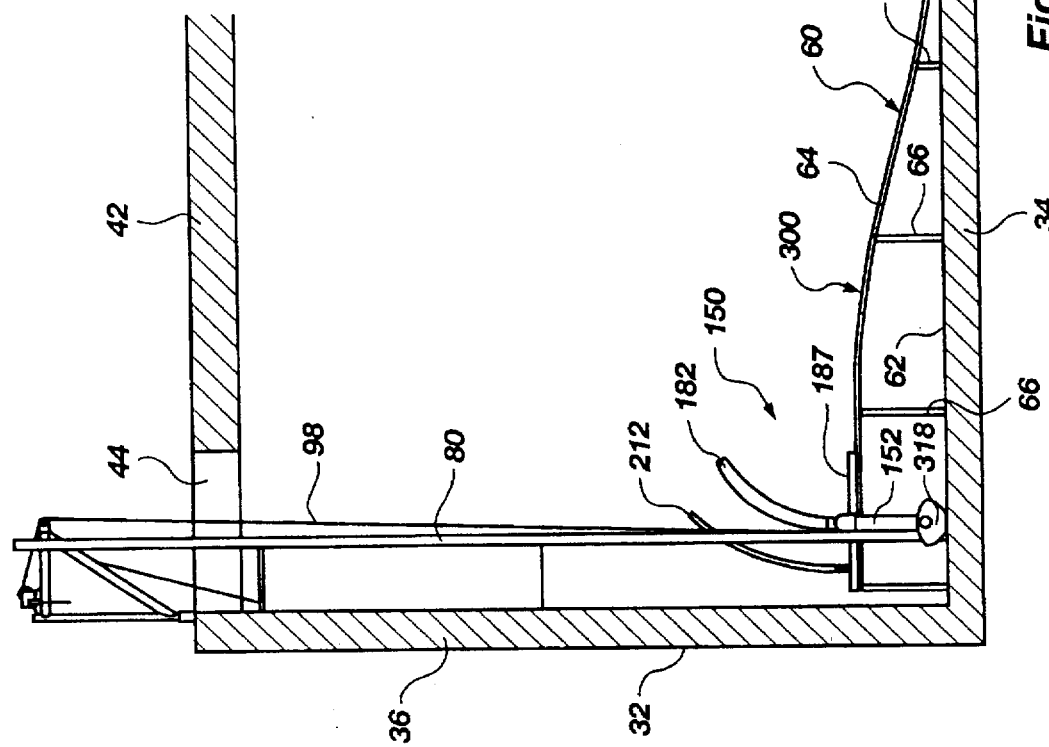

5,720,891

RETRACTABLE SEDIMENT COLLECTING DEVICE FOR COVERED BASINS

BACKGROUND

1. Field of the Invention

This invention relates to mechanisms for collecting sediment from the bottom of settling tanks, and specifically relates to sediment collecting mechanisms which are retractable from covered basins.

2. Statement of the Art

Settling tanks are used in a wide variety of industrial settings to process an influent feed stream or other fluid which contains a solids component. The influent feed stream or other fluid is introduced into the settling tank where the solid component settles out of solution, in whole or in part, by gravity sedimentation. Settling tanks vary in construction and design, but often include some means or mechanism for collecting and removing the solid and particulate matter which has settled to the bottom of the tank. Many settling tanks are designed with a sludge trough or underflow outlet positioned in the bottom of the tank, and a rake arm or similar mechanism generally sweeps the settled solids into the sludge trough or underflow outlet for removal from the tank.

An alternative means of removing settled solids and particulate matter, also referred to herein as "sludge," from the bottom of a settling tank is to aspirate the sludge under negative pressure into a sludge collecting pipe which constantly or periodically moves across the floor of the tank. Such devices have been disclosed in the patent literature, an example of which is disclosed in U.S. Pat. No. 4,401,576 issued to Meurer. The Meurer device comprises a housing which travels under pneumatic force along a track secured to the floor of a sedimentation tank. The Meurer device is but one example of a sediment collection device which is structured to travel along the floor of a settling tank to collect the sludge under vacuum pressure.

Sediment collection devices heretofore known, including the Meurer device, require occasional servicing, the frequency of which may depend on the conditions of the tank, on the type of sludge being produced in the settling tank and the collecting mechanism itself. That is, the sludge collection line may become clogged or, more likely, the mechanisms which move the housing of the device along the track may degrade over time or may become clogged with sludge or debris. In such instances, the sediment collecting device must be serviced in some manner. One means of servicing the sediment collecting device has been to empty the tank entirely of fluid so that workmen can enter the tank and service the device under relatively dry conditions. Alternatively, a diver has had to enter the tank and attempt a repair underwater. If a repair cannot be affected underwater, the sediment collecting device may be disconnected from the track by some means and may be lifted out of the fluid in the tank for servicing.

Servicing a sediment collection device which is installed in an open tank (i.e., a tank having no top or lid) has presented no insurmountable obstacles to date. However, closed settling tanks (i.e., those which have a lid, top or other means of enclosing the interior of the tank) are frequently used, especially in wastewater and runoff treatment systems where noxious or toxic odors are present or are produced as a result of the sedimentation process. In such cases, access to the bottom of the tank is rendered virtually impossible. Servicing the sediment collection device requires taking the settling tank off-line and removing a portion of the top enclosure to access the interior of the tank.

Thus, it would be advantageous to provide a sediment collection device which is constructed to be retractable through a small opening in the top of the tank so that the sediment collection device can be serviced and then easily returned to the tank for continued operation.

SUMMARY OF THE INVENTION

In accordance with the present invention, a retractable sediment collection device is structured to move along the floor of a tank to remove sediment therefrom and is structured to be retractable from the floor of the tank to the top of the tank in a manner which allows access to the sediment collection device for maintenance and servicing above the fluid line in the tank. The present invention is particularly suited for use in closed tank systems which afford only a small access port through which the retractable sediment collection device may be withdrawn for servicing. However, the present invention may also be equally suitable for use in open tanks. The apparatus of the present invention may be adapted for use in virtually any settling or clarifying tank in which sediment settles to the bottom for removal. However, for illustrative purposes, the present invention is described for use in a municipal water clarification tank as one exemplar application.

The retractable sediment collection device of the present invention includes a sediment collector constructed to remove sediment from the floor of a tank (also referred to herein as a "basin") as it moves along the floor of the basin. The retractable sediment collection device also includes a horizontal guide member positioned within the basin, usually along the floor of the basin, along which the sediment collector moves during collection. Further, the retractable sediment collection device also includes a lifting mechanism constructed to engage the sediment collector and to raise it from the floor of the basin to the top of the basin so that the sediment collector can be accessed above the fluid line in the basin.

The sediment collector of the present invention may be any apparatus, having any suitable drive apparatus, which is structured to collect and remove sediment which has settled to the floor of a settling or separation tank. Although many devices may be used, a particularly suitable sediment collector is one which is hydraulically or pneumatically operated to move along the floor of a basin, and one which is structured to aspirate sediment into the sediment collector device under negative pressure supplied by vacuum means. Such devices are generally known in the art and are well described. Principally, such sediment collectors comprise a travel mechanism for securing the sediment collector to a guide rail and moving it therealong, hydraulic or pneumatic means for operating the travel mechanism, a header pipe having a plurality of apertures through which sediment, also referred to herein as "sludge," is aspirated for collection, and a sludge pipe through which the sediment collected by the header pipe is removed from the basin.

The sediment collector of the present invention is unique in its construction in that the header pipe is attached to the travel mechanism in a manner which allows the sediment collector to be engaged by the lifting mechanism for movement above the floor of the basin and which allows the travel mechanism to pivot or move relative to the header pipe so that the travel mechanism can be accessed for repair once the sediment collector has been moved to the top of the basin.

The horizontal guide member of the invention provides a guide along which the sediment collector moves during its travel along the floor of the basin. The horizontal guide member may be structured to extend from one end of the basin to the opposing end of the basin and may be positioned on or near the floor of the basin. The horizontal guide member is structured at one end thereof to guide the sediment collector into position for engagement with the lifting mechanism. In a particularly suitable embodiment, the horizontal guide member may be positioned, in whole or in part, above the floor of the basin so that a portion of the sediment collector is positioned to be engaged by the lifting mechanism.

The lifting mechanism of the retractable sediment collection device is positioned relative to the horizontal guide member so that the lifting mechanism may engage the sediment collector and raise it from near the floor of the basin to near the top of the basin. The lifting mechanism generally comprises a support member having engagement structure which registers with the sediment collector and supports the sediment collector as it is being lifted from the floor of the basin. The support member may be connected to a track system which guides the support member in its ascent to the top of the basin. The track system may be positioned at any suitable location in the basin, but is conveniently positioned against one of the upstanding sides of the basin in alignment with the horizontal guide member. Structure for raising the support member from a first position near the floor of the tank to a second position near the top of the tank is associated with the support member or the track system or both.

BRIEF DESCRIPTION OF THE DRAWINGS

In the drawings, which illustrate what is currently considered to be the best mode for carrying out the invention:

FIG. 1 is a side elevational view in cross section of a covered settling tank in which is positioned one embodiment of the retractable sediment collection device of the present invention;

FIG. 2 is an enlarged view of a portion of the settling tank shown in FIG. 1 illustrating one end of the horizontal guide member and the lower end of the track of the lifting mechanism;

FIG. 3 is a plan view of the horizontal guide member and track taken at line 2—2 of FIG. 2;

FIG. 4 is an enlarged view of a portion of the settling tank shown in FIG. 1 illustrating the opposing end of the horizontal guide member in the settling tank;

FIG. 5 is a plan view of the horizontal guide member taken at line 3—3 of FIG. 4;

FIG. 8 is a front elevational view of one embodiment of the support member of the lifting mechanism;

FIG. 9 is a side elevational view of the support member shown in FIG. 8 taken at line 6—6;

FIG. 10 is a view of the support member positioned in relation to the track of the lifting mechanism, and showing the relative size and positioning of the sediment collector relative thereto;

FIG. 11 is a front elevational view of the sediment collector, shown attached to the horizontal guide member;

FIG. 12 is a plan view of the sediment collector shown in FIG. 11;

FIG. 13 is a bottom view of the mechanical elements of an exemplar travel mechanism shown in FIG. 12;

FIG. 18 is an elevational view in cross section of a portion of a settling tank in which is positioned an alternative embodiment of the retractable sediment collection device of the present invention;

FIG. 19 is an enlarged view of the sediment collector illustrating attachment of the header pipe to the travel mechanism and sludge pipe.

DETAILED DESCRIPTION OF THE ILLUSTRATED EMBODIMENTS

Figure 7:
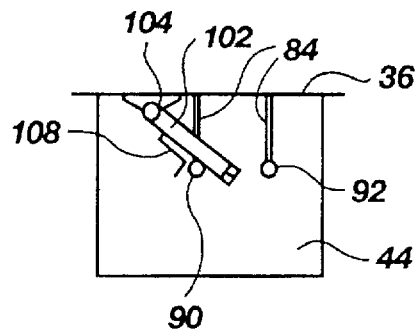
FIG. 7 is a plan view of the lifting mechanism taken at line 5—5 of FIG. 6.

A first embodiment of the retractable sediment collection device 30 of the present invention is shown in FIG. 1 installed in a typical settling tank 32 having a bottom 34 and four continuous sides 36, 38, 40, only three of which are shown. The tank 32 shown in FIG. 1 is closed, having a tank top 42 which covers all of the tank 32 but for a small opening 44 at one end of the tank 32. The tank 32 typically includes a conduit 48 for introducing a fluid into the tank 32, and an overflow launder 50 positioned near the top 42 of the tank 32 into which clarified liquid overflows for removal through an effluent conduit 54.

The retractable sediment collection device 30 of the present invention includes a horizontal guide member 60 which is secured to the floor 62 of the tank 32. The horizontal guide member 60 may be comprised of an upstanding, longitudinal rail 64 which extends substantially from one end wall 36 to the opposing end wall 38, as may be seen in FIGS. 3 and 5. The rail 64 is positioned above the floor 62 of the tank 32 by vertical rail supports 66 which are spaced along the length of the raft 64. The rail supports 66 are secured to the floor 62 of the tank 32 by such means as anchor brackets 68 (FIGS. 3 and 5).

The sediment collector 70 of the retractable sediment collection device 30 is structured to move along the rail 64, from one end wall 36 of the tank 32 to the opposite end wall 38. Typically, the sediment collector 70 moves a selected distance during successive incremental movements until it reaches the opposite end wall 38. At the far end wall 38, a bumper guard 72 is positioned away from the end wall 38 and is secured to the floor 62 of the tank 32. The bumper guard 72 is structured with bumper guides 74, 76 positioned on either side of the rail 64 which prevent the sediment collector 70 from striking the far end wall 38. The sediment collector 70 travels an established number of incremental movements commensurate with the length of the tank 32 and then reverses its direction to travel back toward the opposing end wall 36 of the tank 32 along the rail 64.

The lifting mechanism 80 of the present invention may be suitably positioned along the end wall 36 of the tank 32 in alignment with the opening 44 formed in the top 42 of the tank 32 (see FIG. 6 and 7), and is also aligned with the rail 64, as seen in FIG. 3. The lifting mechanism 80 may comprise a vertical track 82 which extends from the floor 62 of the tank 32 to a distance above the top 42 of the tank 32, extending out of the opening 44 in the top 42. As illustrated more fully in FIGS. 2, 3 and 6, the track 82 may be secured to the end wall 36 by support brackets 84 and may be secured to the floor 62 of the tank 32 by securement structure 86, such as brackets bolted to the floor 62. The support brackets 84 not only secure the track 82 to the end wall 36, but position the track 82 a distance 88 from the end wall 36 sufficient to accommodate the sediment collector 70 in its ascent up the track 82, as explained more fully hereinafter.

Figure 6:
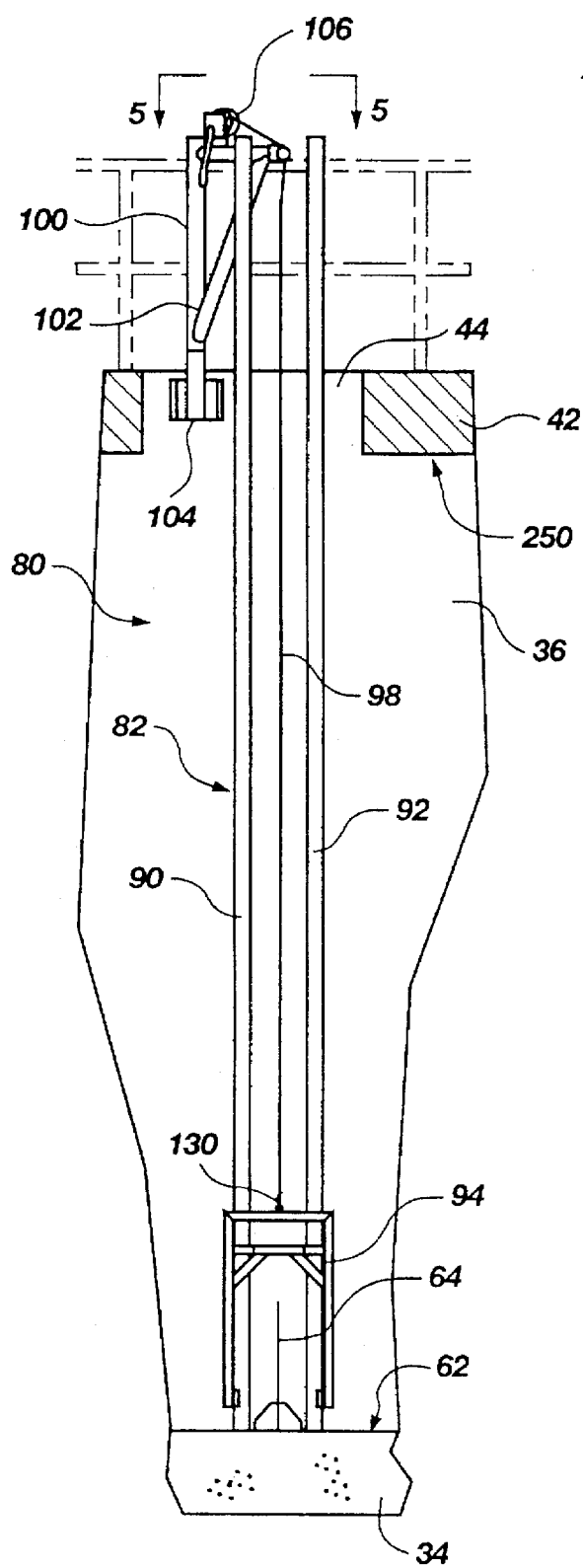
FIG. 6 is a front elevational view of the lifting mechanism of the present invention taken at line 4—4 of FIG. 1.

As illustrated more fully in FIG. 6 and 7, the track 82 of the lifting mechanism may comprise a first guide column 90 in parallel alignment with, and spaced apart from, a second guide column 92. Each guide column 90, 92 extends from the floor 62 of the tank 32 to a point above the top 42 of the tank 32 and extends through the opening 44 formed in the top 42 of the tank 32. The first guide column 90 and second guide column 92 may suitably be tubular in construction. A movable support member or trolley 94 is positioned between the first guide column 90 and the second guide column 92 and is directed in its movement up and down the track 82 by the guide columns 90, 92. Notably, the movable support member or trolley 94 may be raised from the tank 32 without the use of a track 82.

The movable trolley 94 may be raised from a position near the floor 62 of the tank 32 to a position near the top 42 of the tank 32 by any suitable means, such as a cable 98 and a pulley system 100, as shown in FIG. 6. The pulley system 100 may include a frame 102 which is secured by anchoring structure 104 to the end wall 36 of the tank 32. The relative positioning of the frame 102 of the pulley system 100 and the guide columns 90, 92 is better shown in FIG. 7. The cable 98 is attached at one end to the movable trolley 94 and is wound at the other end around a spool 106. The cable 98 may be wound on and off the spool 106 to raise and lower the trolley 94 by rotation of a crank 108 attached to the spool 106. Alternatively, rotation of the spool may be motorized.

The movable trolley 94 of the lifting mechanism is shown more clearly in FIGS. 8–10 where it can be seen that the trolley 94 is comprised of a frame member 110 to which is attached movable attachment apparatus 112 for maintaining the trolley 94 in fixed relation to the track 82 of the lifting mechanism 80. The movable attachment apparatus 112 may be, for example, a plurality of rotatable casters which are positioned on the frame member 110 to register with the guide columns 90, 92 of the track 82. More specifically, a first upper caster 116, a first middle caster 118 and a first lower caster 120 are positioned to register against the first guide column 90, as illustrated in FIG. 10, and to slidably move thereagainst. A second upper caster 122, a second middle caster 124 and a second lower caster 126 are positioned to register again the second guide column 92, as illustrated in FIG. 10, and to slidably move thereagainst.

The frame member 110 of the trolley 94 is structured with an eye 130 through which the cable 98 is secured for raising and lowering the trolley 94. The frame member 110 is also structured with engagement structure for retaining the sediment collector 70 in relation to the frame member 110, such as a first hook member 134 which is in parallel alignment with, and spaced apart from, a second hook member 136. The first hook member 134 and second hook member 136 extend outwardly from the front surface 138 of the frame member 110 a distance sufficient to engage the sediment collector 70, as described more fully below. Both the first hook member 134 and second hook member 136 are structured with a depression 140 which is sized to receive a portion of the sediment collector 70 in engagement therewith.

The sediment collector 150 of the present invention is illustrated in FIGS. 11–15. Referring to FIG. 11, the sediment collector 150 includes a header pipe 152 which is comprised of an upper header pipe section 154 joined to a first lateral header pipe section 156 by a first header pipe midsection 158, and is joined to a second lateral header pipe section 160 by a second header pipe midsection 162. Each lateral header pipe section 156, 160 extends from the respective header pipe midsection 158, 162 to an outer end 166, 168. The outer ends 166, 168 of the header pipe 152 may extend to the side walls of the tank 32 in an installation where, for example, one rail 64 is positioned down the center of the tank 32. Alternatively, more than one rail 64 may be installed in a tank 32 in parallel alignment, and the outer ends 166, 168 of the header pipe 152 would extend only as far as the next adjacent header pipe 152 installation.

The lateral header pipe sections 156, 160 are structured with apertures 170 which are oriented toward the floor 62 of the tank 32 so that sediment can be drawn into the apertures 170. The lateral header pipe sections 156, 160 are positioned slightly above the floor 62 of the tank 32 and are maintained in that position by skid members 174, 176 which slide along the floor 62 of the tank 32 as the sediment collector 150 travels along the rail 64.

Figure 15:
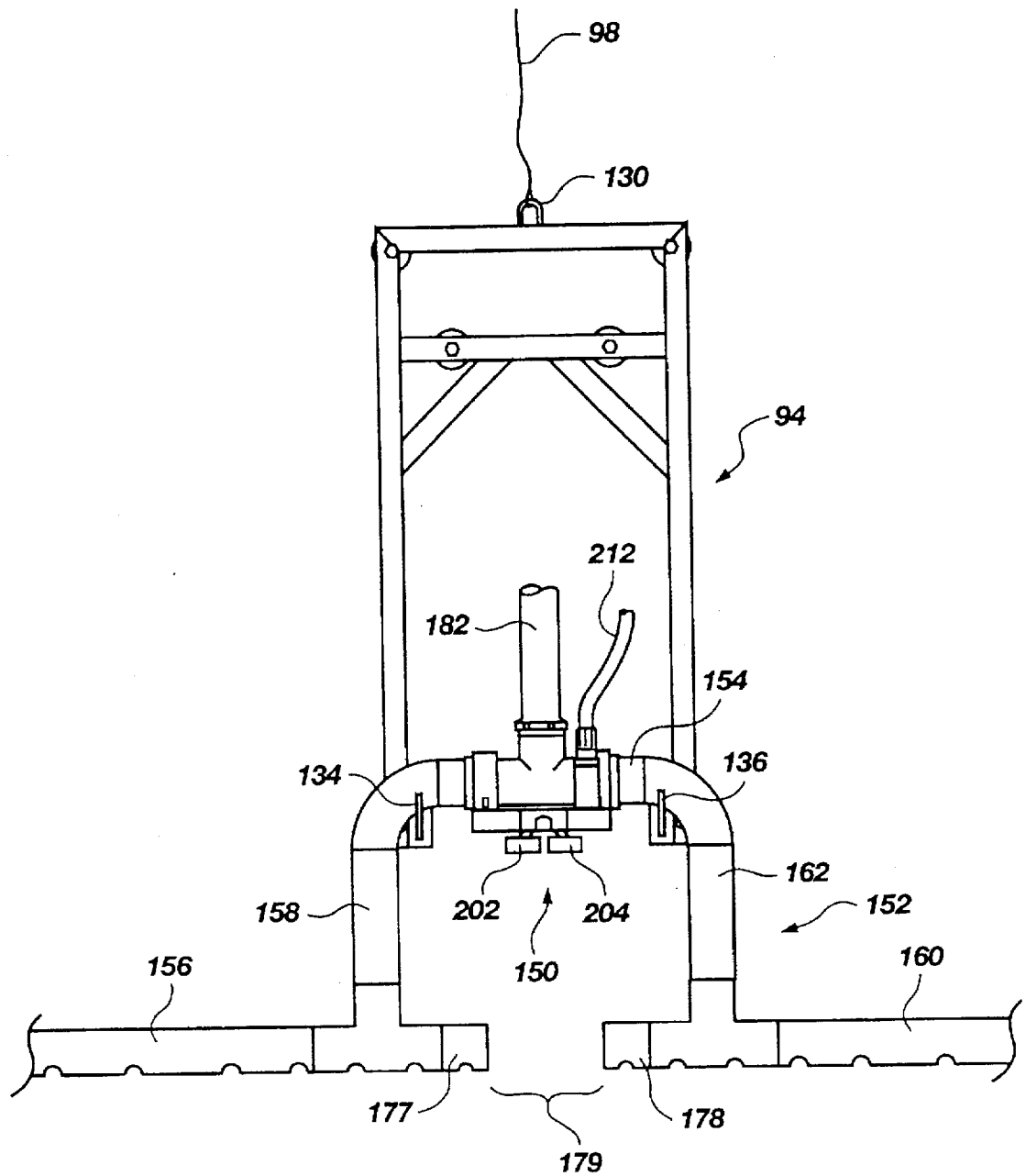
FIG. 15 is a partial front elevational view illustrating the sediment collector engaged by the support member of the lifting mechanism.

FIG. 15 illustrates an alternative embodiment of the header pipe 152 where the lateral header pipe sections 156, 160 each extend inwardly from the header pipe midsections 158, 162 to provide a central lateral header pipe section 177, 178 which extends toward the horizontal guide member 60, or center of the tank 32. The central lateral header pipe sections 177, 178 assure that sediment will be aspirated through the apertures 170 formed in the central lateral header pipe sections 177, 178 to effective clean sediment from around the horizontal guide member 60 or from the center of the tank 32. A distance 179 remains between the central lateral header pipe sections 177, 178, however, to provide movement of the sediment collector 150 therebetween.

The upper header pipe section 154 is structured with a pipe coupling 180 to which is attachable a sludge hose 182 (shown in FIG. 11 in an exploded view). The sludge hose 182 is sized in length to extend outside the tank 32 where it may be attached to, for example, a vacuum pump (not shown) which provides a source of negative pressure to the header pipe 152. As the header pipe 152 travels through the tank 32, sediment is aspirated through the apertures 170 into the header pipe 152 and into the sludge hose 182 for withdrawal out of the tank 32.

To the upper header pipe section 154 is movably connected a travel mechanism 184 which operates to move the sediment collector 150 back and forth along the rail 64. The travel mechanism 184 generally includes a housing 186, having a hood 187 (FIG. 12), which encloses movement elements, shown in FIG. 13. The movement elements operate to move the sediment collector 150 along the rail 64. Any suitable means may be employed in the sediment collector 150 to provide movement along the rail 64. One exemplar means, however, is a pneumatically-driven mechanism illustrated in FIG. 13 which comprises a pair of pneumatically-operated braking mechanisms 188, 190 that work in tandem with a pair of pneumatically-driven pistons 192, 194 to move the sediment collector 150 in small, consecutive movements.

The travel mechanism 184 is structured with a continuous channel 196 formed between adjacent inflatable brake pads 198, 200 of the first braking mechanism 188 and between adjacent inflatable brake pads 202, 204 of the second braking mechanism 190. Thus, when the sediment collector 150 is positioned on the rail 64, as shown in FIG. 11, at least one pair of adjacent inflatable brakes 202, 204 is filled with air and the inflatable brakes 202, 204 expand outwardly to grip the rail 64.

In brief, the travel mechanism 184 operates as follows: The first braking mechanism 188 is contained within a first body member 208 which is slidable relative to the housing 186, and the second braking mechanism 190 is contained within a second body member 210 which is slidable relative to the housing 186. Air furnished through an air supply hose 212 (FIG. 11), which is attached to an air tube coupling 214 formed on the hood 187, is supplied to a plurality of air conduits 216 connected to the inflatable brake pads 198, 200, 202, 204 and the pistons 192, 194. As air is provided to, for example, the first inflatable brake pads 198, 200, thereby securing the inflatable brake pads 198, 200 to the rail 64, air is also supplied to the second piston 194 which causes the second body member 210 to slide along the rail 64 away from the first body member 208. Air is then supplied to the second inflatable brake pads 202, 204, thereby causing the inflatable brake pads 202, 204 to secure the rail 64, and air is also supplied to the first piston 192. Air is simultaneously withheld from the first inflatable brake pads 198, 200, thereby releasing their grip on the rail 64, and from the second piston 194. As the second inflatable brake pads 202, 204 grip the rail 64, the first piston 192 moves the first body member 208 in closer proximity to the second body member 210. Thus, the reciprocating movement of the first and second body members 208, 210 urge the travel mechanism 184 along the rail 64. It should be noted that the air supply hose 212 is sized in length to extend out of the tank 32 to communicate with an air source (not shown).

Figure 14:
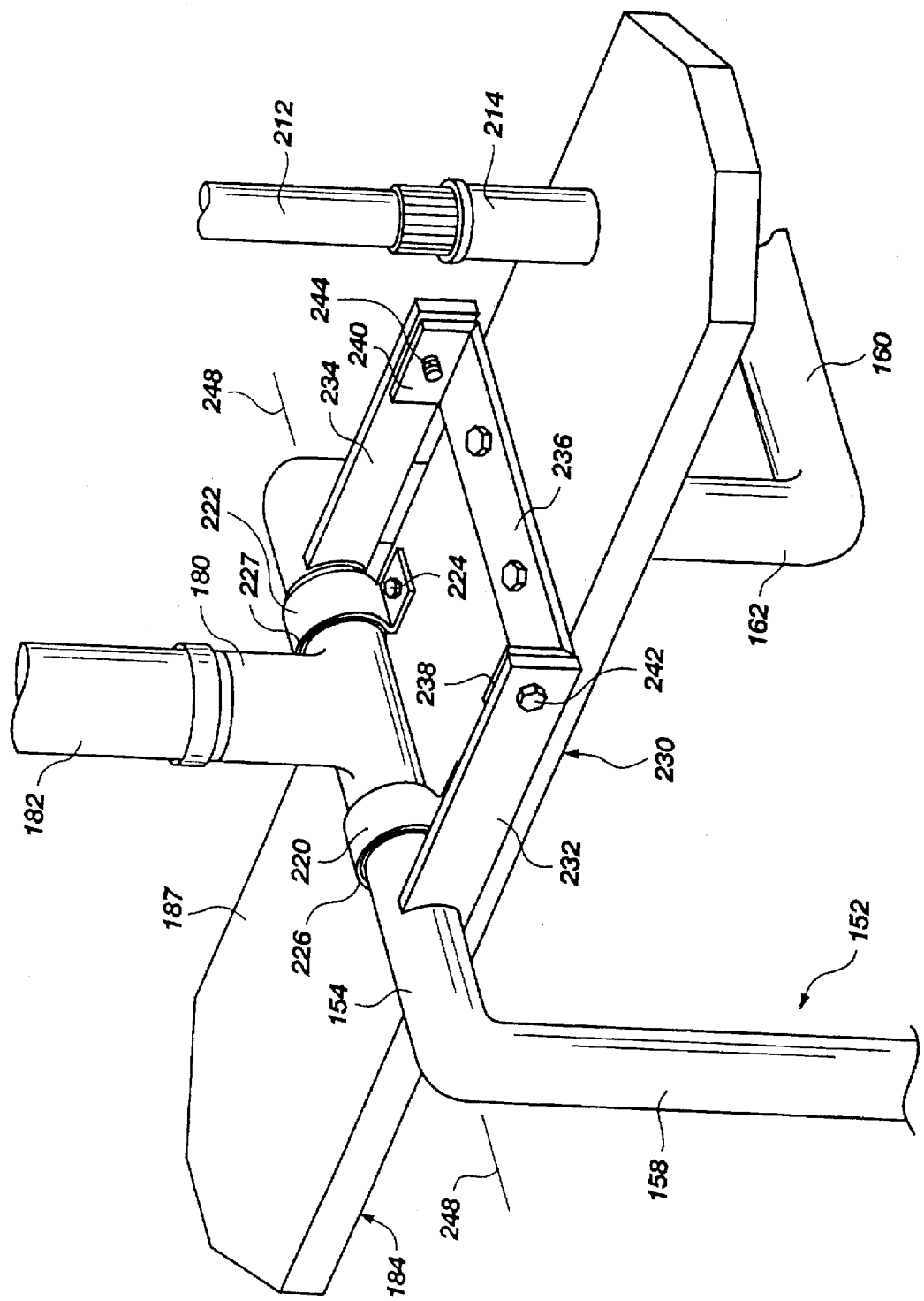
FIG. 14 is a perspective view of a portion of the sediment collector illustrating the attachment of the header pipe to the travel mechanism.

The travel mechanism 184 is movably connected to the upper header pipe section 154 by structural means which allow the travel mechanism 184 to rotate about the upper header pipe section 154 when the sediment collector 150 is retracted from the tank 32. For example, as illustrated in FIG. 14, the upper header pipe section 154 may be connected to the hood 187 of the travel mechanism 184 by saddle clamps 220, 222 which are positioned over the upper header pipe section 154 and secured to the hood 187 by attachment means, such screws 224, welding or other appropriate means. A bearing 226, 227 is preferably positioned between the saddle clamps 220, 222 and the upper header pipe section 154 to facilitate rotation of the upper header pipe 154 relative to the saddle clamps 220, 222. To maintain the travel mechanism 184 in proper orientation to the header pipe 152, and to permit temporary movement of the travel mechanism 184 relative to the header pipe 152, a releasable brace member 230 (FIG. 12) may be positioned between the upper header pipe section 154 and the hood 187 of the travel mechanism 184.

The releasable brace member 230 may, for example, comprise arm members 232, 234 which are each secured to the upper header pipe section 154 by suitable means such as welding. Alternatively, the arm members 232, 234 may be integrally formed with the upper header pipe section 154. The releasable brace member 230 may also include a bracket 236, secured to the hood 187 of the travel mechanism 184, which has flanges 238, 240 positioned to register against arm members 232, 234. The arm members 232, 234 may be fastened to the flanges 238, 240 of the bracket 236 by releasable means, such as screws 242, 244 or other suitable means. Thus, when screws 242, 244 are removed from the arm members 232, 234 and the flanges 238, 240 of the bracket 236, the hood 187 of the travel mechanism 184 is free to rotate about an axis 248 formed through the upper header pipe section 154, and the saddle clamps 220, 222 and bearings 226, 227 are free to rotate about the upper header pipe section 154 as well.

The retractable sediment collection device 30 of the present invention operates within the settling tank 32 as described heretofore to remove sediment from the floor 62 of the tank 32 as the sediment collector 150 travels back and forth on the rail 64 of the horizontal guide member 60. On occasion, it becomes necessary or desirable to retract the sediment collector 150 from the tank 32 to effect repairs or to maintain the various mechanisms of the sediment collector 150. On such occasions, all air supply to the sediment collector 150 is terminated once the sediment collector 150 returns to the end wall 36 of the tank 32 where the lifting mechanism 80 is located. The trolley 94 of the lifting mechanism 80 is lowered to a first position at the bottom of the track 82 near the floor 62 of the tank 32, as shown in FIG. 6. When the sediment collector 150 has moved to the very end of the horizontal guide member 60 such that the upper header pipe section 154 is in close proximity to the track 82, the trolley 94 is raised by turning the crank 108 to reel in the cable 98 on the spool 106. As the cable 98 raises the trolley 94, the hook members 134, 136 engage the upper header pipe section 154, as shown in FIG. 15, and the upper header pipe section 154 comes to rest in the depression 140 formed in the hook members 134, 136. The travel mechanism 154 is free to detach from the rail 64 because the inflatable brake pads 198, 200, 202, 204 are not inflated with air and are not engaging the rail 64.

As the trolley 94 moves upwardly along the track 82, lifting the sediment collector 150 and header pipe 152, the travel mechanism 154 and hood 187 remain at a perpendicular orientation to the header pipe midsections 158, 162, as shown in FIGS. 11 and 12. As the trolley 94 reaches the top 42 of the tank 32 and moves through the opening 44 in the top 42, the lateral header pipe sections 156, 160 contact the under surface 250 (FIG. 6) of the top 42 preventing further upward movement of the sediment collector 150. The trolley 94, however, is positioned above the top 42 of the tank 32 and is accessible for manipulation. The screws 242, 244 may then be removed from the flanges 238, 240 of the bracket 236, thereby allowing the hood 187 to rotate freely about the upper header pipe section 154 as previously described.

Figure 16:
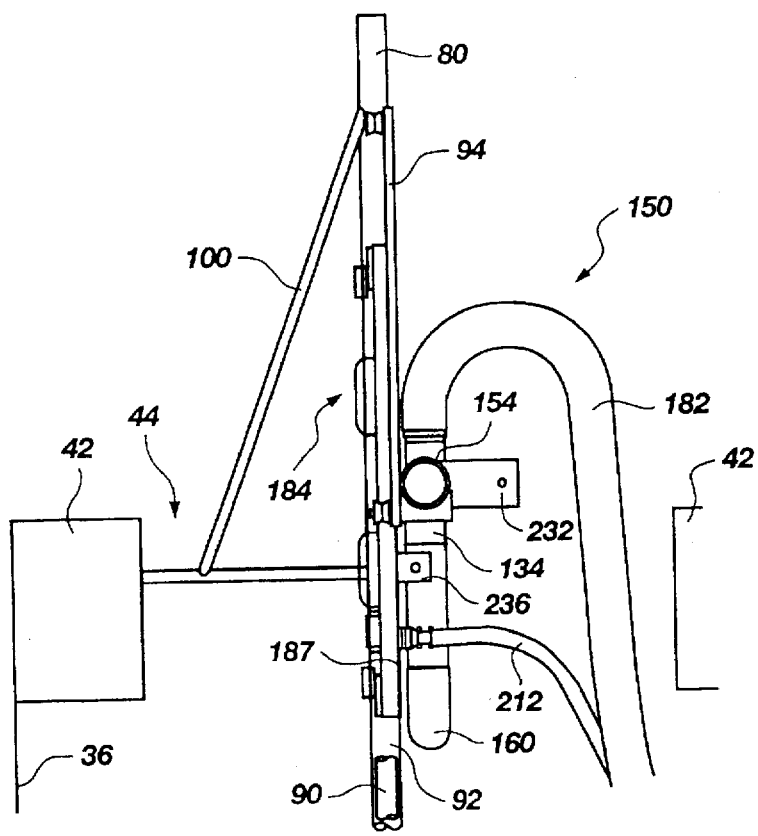
FIG. 16 is a partial side elevational view of the sediment collector attached to the support member of the lifting mechanism, the sediment collector being rotated relative to the track system to be accessible above the fluid line of the tank.
Figure 17:
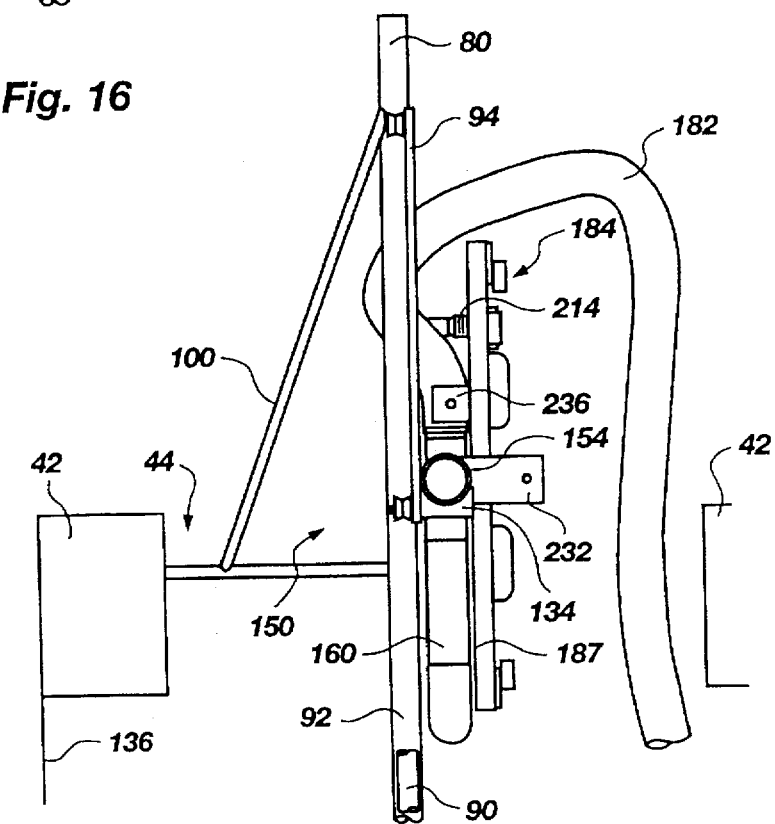
FIG. 17 is a partial side elevational view of the sediment collector attached to the support member of the lifting mechanism, the sediment collector being rotated in the opposing direction to that shown in FIG. 16 providing access to the travel mechanism.

As shown more clearly in FIGS. 16 and 17, once the sediment collector 150 is raised to the top of the track 82, and the arm members 232, 234 are released from the bracket 236 connected to the hood 187, the travel mechanism 184 may be rotated relative to the upper header pipe section 154 in one of two rotational directions to provide access to the various elements of the travel mechanism 184. FIG. 16 illustrates how the hood 187 may be rotated toward the end wall 36 of the tank 32 and in the direction of the track 82. Alternatively, as shown in FIG. 17, the hood 187 may be rotated in a direction away from the end wall 36 of the tank 32 and away from the track 82. Notably, the sludge hose 182 and air supply hose 212 are illustrated as being draped inwardly to the tank 32 to indicate that the travel mechanism 184 may rotate equally well in either direction without the sludge hose 182 or air supply hose 212 acting as an impediment. Once the repairs or maintenance on the travel mechanism 184 are completed, the hood 187 may be rotated again to bring the hood 187 in perpendicular orientation relative to the header pipe midsections 158, 160 and the screws 242, 244 may be replaced to secure the arm members 232, 234 to the bracket 236. The sediment collector 150 may then be lowered on the trolley 94 back into the tank 32 until the travel mechanism 154 once again engages the rail (64.

Figure 20:
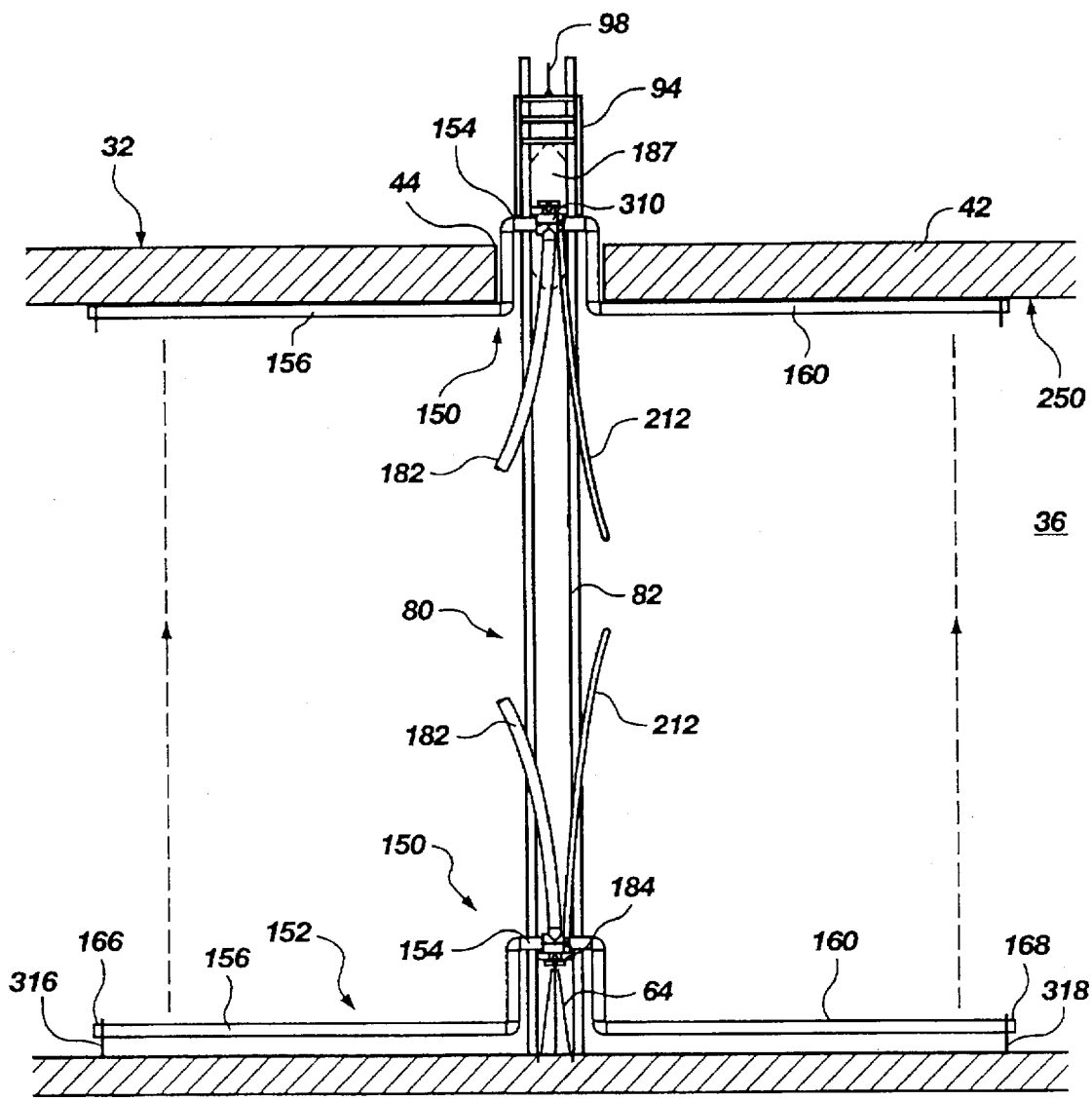
FIG. 20 is a front elevational view of the alternative embodiment of the invention shown in FIGS. 18 and 19, illustrating movement of the sediment collector from a first position near the floor of the tank to a second position near the top of the tank.

In an alternative embodiment of the present invention shown in FIGS. 18–20, the sediment collector 150 and horizontal guide member 60 are structured to provide a more conventional sediment collection device which maintains a profile close to the floor 62 of the tank 32, but which is unique in its manner of retractability from the tank 32. Specifically, the horizontal guide member 60 may be structured with a first portion 300, located near the end wall 36 of the tank 32 in proximity to the lifting mechanism 80, which is structured with rail support members 66 of varying heights to gradually raise the horizontal guide member 60 above the floor 62 of the tank 32 as the rail 64 approaches the end wall 36. Thus, the first portion 300 of the horizontal guide member 60 gradually slopes downwardly to a second portion 302 of the horizontal guide member 60 which is positioned in close proximity to the floor 62 of the tank 32. As illustrated in FIG. 18, when the sediment collector 150 is positioned nearest the end wall 36 of the tank 32, the header pipe 152 is oriented substantially perpendicularly to the hood 187 of the sediment collector 150. As the sediment collector 150 moves along the length of the horizontal guide member 60 away from the end wall 36 of the tank 32, the downward slope of the horizontal guide member 60 causes the header pipe 152 to rotate relative to the hood 187 so that the header pipe 152 eventually comes to lie in a substantially parallel orientation to the floor 62 of the tank 32 and in substantially parallel orientation to the hood 187.

In order to effect the movement of the sediment collector 150 as previously described with respect to the embodiment shown in FIGS. 18–20, the sediment collector 150 is structured to permit the header pipe 152 to move relative to the travel mechanism 184 so that the header pipe 152 may be substantially perpendicular to, or substantially parallel to, the hood 187 depending on its position along the horizontal guide member 60. Thus, in the illustrated embodiment of FIG. 19, the sludge hose 182 may be secured to a header pipe housing 310, and the upper header pipe section 154 may consist of a first pipe section 312 and second pipe section 314, each of which is rotatable affixed to the header pipe housing 310 so that lateral header pipe sections 156, 160 can rotate relative to the travel mechanism 184. Movement of the header pipe 152 relative to the travel mechanism 184 is assisted by semi-circular-shaped skid members 316, 318 (FIG. 20) positioned at the outer ends 166, 168 of the header pipe 152. The semi-circular shape of the skid members 316, 318 permit the sediment collector 150 to slide along the floor 62 at the proper distance above the floor 62 of the tank 32 and prevents wear on the header pipe 152.

The configuration of the horizontal guide member 60 and the sediment collector 150 permit retraction of the sediment collector 150 from the tank 32 as illustrated in FIG. 20. As the sediment collector 150 travels along the rail 64 approaching the end wall 36 of the tank 32, the travel mechanism 184 moves upwardly on the rail 64 and the header pipe 152 is caused to rotate relative to the header pipe housing 310. The upper header pipe section 154 is then in position, to be engaged by the hook members of the trolley 94 as previously described. The sediment collector 150 may then be raised to the top 42 of the tank 32. The lateral header pipe sections 156, 160 contact the under surface 250 of the top 42 while the upper header pipe section 154 and travel mechanism 184 move through the opening 44 in the top 42 of the tank 32. The hood 187 of the travel mechanism 184 may then be rotated relative to the upper header pipe section 154, which is retained by the hook members of the trolley 94, to expose the mechanisms under the hood 187 for repair and maintenance.

The retractable sediment collection device of the present invention is structured to permit the device to be raised from the bottom of a settling tank or basin, and a portion of the device to be exposed so that repairs or maintenance to the mechanisms may be made. The retractable sediment collection device of the present invention is particularly suitable for use in covered tanks where access to the interior of the tank is very limited, thereby necessitating the ability to access the sediment collection device through a small opening in the top of the tank. The retractable sediment collection device of the present invention is equally suitable for use in open tanks, however, and may be instrumental in preventing the need to enter the tank to effect repairs. The present invention may be installed in virtually any type of settling tank or basin. Hence, reference herein to specific details of the illustrated embodiments is by way of example and not by way of limitation. It will be apparent to those skilled in the art that many modifications of the basic illustrated embodiments may be made without departing from the spirit and scope of the invention as recited by the claims.

What is claimed is:

1. A retractable sediment collection device comprising:
   a horizontal guide positionable along a floor of a tank;
   a sediment collector movable along said horizontal guide to collect sediment on the floor of the tank;
   a lift vertically movable between a first lowered position in alignment with said horizontal guide and a second raised position above the horizontal guide, the lift further comprising an attachment for detachably engaging the collector for retaining said sediment collector in a fixed position relative to said lift as said lift moves said sediment collector from the first position proximate said horizontal guideto the second position distanced away from said horizontal guide.

2. The retractable sediment collection device of claim 1 wherein said sediment collector comprises a header structured to collect sediment therein and a housing for engaging said horizontal guide, said header being mounted to said housing to pivot about a generally horizontal axis.

3. The retractable sediment collection device of claim 2 wherein said lift comprises a movable support having hooks for retaining said header in fixed relationship therewith, and further comprising a raising mechanism for raising said support from said first position to said second position.

4. The retractable sediment collection device of claim 3 wherein said lift further comprises a track for guiding said movable support from said first position to said second position.

5. The retractable sediment collection device of claim 4 wherein said track member is perpendicularly oriented relative to said horizontal guide member.

6. The retractable sediment collection device of claim 5 wherein said track is mounted to the wall of a tank.

7. The retractable sediment collection device of claim 5 wherein said raising mechanism is a cable.

8. The retractable sediment collection device of claim 2 wherein said horizontal guide is substantially linear and is structured with raised supports for positioning the horizontal guide above the floor of a tank.

9. The retractable sediment collection device of claim 2 wherein said horizontal guide is curvilinear along its length, having a first portion oriented in proximity to said lift and a second portion oriented away from said lift, said first potion of said horizontal guide having raised supports for positioning the horizontal guide above the floor of a tank and said second portion of said horizontal guide being oriented to lie in proximity to the floor of a tank.

10. The retractable sediment collection device of claim 9 wherein said header has skid members connected thereto having for movement along the floor of the tank.

11. A settling tank having a retractable sediment collection device comprising:

a tank having a top, a floor and upstanding sides;

a movable sediment collector positioned within said tank;

a guide positioned in said tank for guiding said movable sediment collector along said floor of said tank;

a lift for raising said sediment collector from a first position near said floor of said tank to a second position apart from the guide and toward said top of said tank.

12. The settling tank of claim 11 wherein said guide has a rail positioned along said floor of said tank.

13. The settling tank of claim 12 wherein said sediment collector comprises a carriage engaging said rail and a header structured to collect and remove sediment on said floor of said tank, said header being pivotally connected to said carriage.

14. The settling tank of claim 13 wherein said lift comprises a movable support having an attachment for detachably engaging the header, and further comprising a raising mechanism for raising said support from said first position to said second position.

15. The settling tank of claim 14 wherein said lift further comprises a track for vertically guiding said movable support.

16. The settling tank of claim 15 wherein said track is connected to said upstanding sides of said tank.

17. The settling tank of claim 13 wherein said guide is linear along its length and is structured with supports for supporting said guide member a selected distance above said floor of said tank.

18. The settling tank of claim 13 wherein said guide is curvilinear alone its length, having a first portion oriented in proximity to said lift and a second portion oriented away from said lift, said first portion of said guide having a raised support for positioning the guide above said floor of said tank and said second portion of said guide being oriented to lie in proximity to said floor of said tank.

19. The settling tank of claim 11 wherein said top of said tank is substantially closed.

20. A method for retracting a sediment collection device from a settling tank comprising:

providing a settling tank having a sediment collector positioned therein movable along the floor of said tank to collect and remove sediment on said floor of said tank, said sediment collector having a header pivotally connected to a carriage moving the sediment collector within said tank;

providing a lift having a support detachably engaging and retaining said sediment collector in fixed relation thereto;

positioning said support in proximity to said floor of said tank;

detachably securing said sediment collector to said support;

raising said support from near said floor to adjacent the top of said tank; and rotating said carriage relative to said header to position said carriage for access thereto.

* * * * *

UNITED STATES PATENT AND TRADEMARK OFFICE
CERTIFICATE OF CORRECTION

PATENT NO : 5,720,891
DATED : February 24, 1998
INVENTOR(S) : Cook et al.

It is certified that error appears in the above-identified patent and that said Letters Patent are hereby corrected as shown below:

Column 4, line 10, change "fine" to --line--;
Column 4, line 52, change "raft" to --rail--;

Column 8, line 15, change "beatings" to --bearings--;
Column 9, line 14, delete "( ";
Column 10, line 47, change "guideto" to --guide to--;
Column 10, line 64, delete "member";
Column 10, line 65, delete "member";
Column 11, line 17, delete "having"; and
Column 12, line 11, change "alone" to --along--.

Signed and Sealed this

Seventeenth Day of August, 1999

Attest:

Q. TODD DICKINSON

*Attesting Officer*       *Acting Commissioner of Patents and Trademarks*

UNITED STATES PATENT AND TRADEMARK OFFICE
CERTIFICATE OF CORRECTION

PATENT NO. : 5,720,891
DATED : February 24, 1998
INVENTOR(S) : Cook et al.

It is certified that error appears in the above-identified patent and that said Letters Patent is hereby corrected as shown below:

In column 7, line 55, change "means" to --apparatus--;
In column 7, line 55, after "such" insert --as--; and
In column 8, line 9, change "means" to --apparatus--.

Signed and Sealed this

Eleventh Day of July, 2000

Attest:

Q. TODD DICKINSON

*Attesting Officer*   *Director of Patents and Trademarks*